No. 606,747. Patented July 5, 1898.
G. THOMAS.
ATTACHMENT FOR SPECTACLES OR EYEGLASSES.
(Application filed Sept. 22, 1897.)

(No Model.) 2 Sheets—Sheet 1.

Fig. 5ª.

Witnesses
E. G. Wurdeman
S. S. Williamson

Inventor
George Thomas
by Geo. H. Holgate
Attorney

No. 606,747. Patented July 5, 1898.
G. THOMAS.
ATTACHMENT FOR SPECTACLES OR EYEGLASSES.
(Application filed Sept. 22, 1897.)

(No Model.) 2 Sheets—Sheet 2.

Witnesses.
E. C. Wurdeman
J. Williamson

Inventor
George Thomas.
by Geo. H. Holgate
Attorney

UNITED STATES PATENT OFFICE.

GEORGE THOMAS, OF PHILADELPHIA, PENNSYLVANIA.

ATTACHMENT FOR SPECTACLES OR EYEGLASSES.

SPECIFICATION forming part of Letters Patent No. 606,747, dated July 5, 1898.

Application filed September 22, 1897. Serial No. 652,518. (No model.)

*To all whom it may concern:*

Be it known that I, GEORGE THOMAS, a citizen of the United States, residing at Philadelphia, in the county of Philadelphia and State of Pennsylvania, have invented a certain new and useful Improvement in Attachments for Spectacles or Eyeglasses, of which the following is a specification.

My invention relates to a new and useful improvement in attachments for eyeglasses and spectacles, and has for its object to provide a simple and effective means whereby a secondary glass, such as a colored glass, may be readily attached to or detached from the primary glasses or glass-frame, thereby affording the wearer a convenient means for protecting the eyes from undue light or strain.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1:
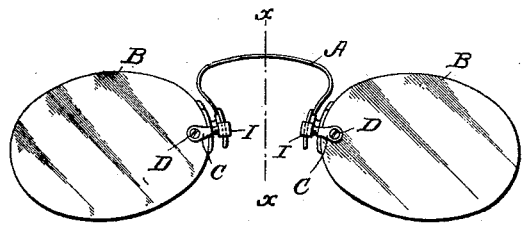
Figure 2:
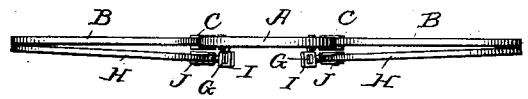
Figure 3:
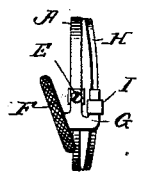
Figure 4:
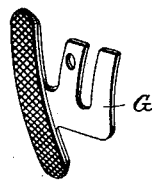
Figure 5:
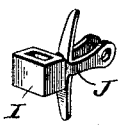
Figure 5:
Figure 6:
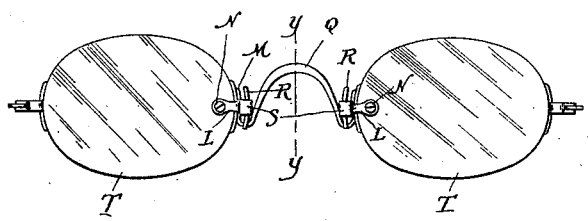
Figure 7:
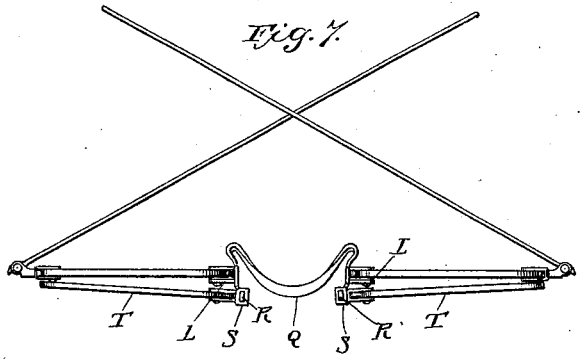
Figure 8:
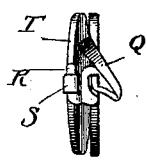
Figure 9:
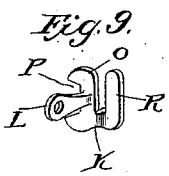

Figure 1 is a side view of a pair of noseglasses embodying my improvement; Fig. 2, a top edge view thereof, clearly showing the secondary glasses in place; Fig. 3, a section at the line $x$ $x$ of Fig. 1; Fig. 4, a detail perspective of one of the nose-pieces, showing the clip for the reception of the socket of the extra glass; Fig. 5, a similar view of a socket adapted to pass into engagement with the clip; Fig. 5$^a$, a view of prong adapted for attachment to the frame of the glasses by brazing; Fig. 6, a view similar to Fig. 1, illustrating the embodiment of my improvement to a pair of spectacles and showing a slight modification of the clip for the reception of the extra glass by adapting it for securement to the primary glass by the same screw which holds the bridge in place; Fig. 7, a top edge view of a pair of spectacles, showing the extra glasses in place; Fig. 8, a section at the line $y$ $y$ of Fig. 6, and Fig. 9 a detail perspective of the clip used in the adaptation of my improvement to spectacles.

In carrying out my invention as embodied in Figs. 1 to 5, inclusive, A represents the bridge or bow, to which is attached the primary glasses or lenses B by means of the usual clips C, these clips being secured to the glasses by the screws D. These parts just mentioned may be of any ordinary construction and do not directly form any part of my invention.

In the construction here shown the nose-piece or bow is attached to each of the clips C by a screw E, and I utilize this screw in the usual manner to secure the nose-piece and its plate F to the glasses, and by forming a prong G with the nose-piece plate I thereby provide means for attaching the extra glass, as will be hereinafter set forth.

H represents the extra glasses, which are usually intended to be plano colored glass, and each of these extra glasses has secured thereto the socket I by means of the clip J, and this socket is adapted to engage with and pass over one of the prongs G, thereby being brought into proper relation to the primary glass to shield the latter from undue light, and the secondary glass when thus placed will be securely held against accidental displacement, as clearly shown in Fig. 2. At any time should it become desirable to remove the extra glasses this may be quickly accomplished by forcing the socket upward from off the prong. It is to be noted that this means of attaching the extra glasses to the primary glasses requires but little addition other than the extra glasses themselves, since the nose-piece plate is the same in all respects as an ordinary plate with the exception of the extended prong; but of course I do not wish to limit myself to the formation of the prong with the nose-piece plate, since it is obvious that such a prong may be attached directly to the primary glass either by a screw or by brazing, a form suitable for that purpose being shown in Fig. 5$^a$.

In Figs. 6 to 9, inclusive, I adapt my improvement to an ordinary pair of spectacles by the use of a secondary clip K, which has a hole L for the passage of a screw, and by placing this clip upon the primary clip M, so that the hole therein registers with the hole in said primary clip, the screw N is utilized for the securement of both clips to the spectacles. The secondary clip K carries a plate O, having a cut-away portion P therein for embracing the nose-piece Q at the point of its attachment to the primary clip, as clearly shown in Fig. 8, while a post or prong R is also formed with the plate O, and this prong is adapted to receive the socket S of the secondary glass T, said socket being of the same construction described in connection with the first figures. By this arrangement my improvement may be readily attached to a pair of glasses or spectacles without interfering with or altering the latter in any manner, and when so attached will afford great convenience to the wearer of such devices by permitting the attachment of the colored glasses whenever needed and the detachment thereof when not so needed. In practice this will be found to be a great convenience and afford a much-needed protection to persons having weak eyes, avoiding the necessity of having to carry two pairs of glasses or spectacles and having the additional advantage of using the correcting or primary glasses, while at the same time using the modifying or colored glasses, thus in no way interfering with the correct vision of the user.

Having thus fully described my invention, what I claim as new and useful is—

1. In combination with a pair of eyeglasses or spectacles, vertically-extending prongs secured to each of the lenses at the nose-bridge thereof, secondary glasses, clips carried thereby, sockets formed with the clips fitting over the prongs, as and for the purpose described.

2. In combination with a pair of eyeglasses or spectacles, two U-shaped members each having one of its arms secured to the rim of one of the lenses, the other arm projecting upwardly forming a prong, a pair of secondary glasses carrying sockets fitting over the prongs, as and for the purpose described.

3. In combination with the lenses of a pair of spectacles, of a nose-piece, secondary clips detachably secured to the lenses, means for holding said clips in proper relative positions to the nose-piece, a prong formed with the secondary clip, a socket fitting over the prong, a clip with which said socket is formed and a secondary glass attached to said clip, as and for the purpose described.

In testimony whereof I have hereunto affixed my signature in the presence of two subscribing witnesses.

GEORGE THOMAS.

Witnesses:
GEORGE McCURDY,
S. S. WILLIAMSON.